United States Patent [19]

Shane

[11] Patent Number: 5,638,646
[45] Date of Patent: Jun. 17, 1997

[54] TRAVELER'S QUARTERS

[76] Inventor: Penny Petersen Shane, P.O. Box 681407, Park City, Utah 84068

[21] Appl. No.: 364,044

[22] Filed: Dec. 27, 1994

[51] Int. Cl.$^6$ .................................. E04H 1/12; G06F 7/08
[52] U.S. Cl. .................. 52/79.1; 52/36.2; 52/33; 235/382.5; 340/825.31
[58] Field of Search ................. 52/64, 79.1, 36.1, 52/36.2, 33–35, 27; 70/278; 109/35; 186/35, 38; 235/382, 382.5, 379; 340/825.31, 825.33, 825.34, 825.24

[56] References Cited

U.S. PATENT DOCUMENTS

| | | | |
|---|---|---|---|
| 3,118,187 | 1/1964 | Alimanestiano | 52/36.2 X |
| 3,492,767 | 2/1970 | Pincus | 52/79.1 X |
| 3,512,314 | 5/1970 | George et al. | |
| 3,553,911 | 1/1971 | Morrow et al. | 52/36.2 X |
| 3,742,453 | 6/1973 | Poylo | 235/382 |
| 3,781,805 | 12/1973 | O'Neal, Jr. | 235/382 |
| 3,923,134 | 12/1975 | Rezazadeh | |
| 4,237,799 | 12/1980 | Berman | |
| 4,811,012 | 3/1989 | Rollins | 235/382.5 |
| 4,900,906 | 2/1990 | Pusic | 235/382.5 X |
| 5,070,661 | 12/1991 | Lo Guidici | 52/79.1 |
| 5,111,626 | 5/1992 | Fortune | |
| 5,223,829 | 6/1993 | Watabe | 340/825.31 |
| 5,231,272 | 7/1993 | Mardon | 235/382 |
| 5,239,792 | 8/1993 | Avni | |
| 5,520,275 | 5/1996 | Foglino | 340/825.31 X |
| 5,520,450 | 5/1996 | Colson, Jr. et al. | 340/825.31 X |

FOREIGN PATENT DOCUMENTS

| | | |
|---|---|---|
| 0459852 | 12/1991 | European Pat. Off. . |
| 1406672 | 6/1965 | France . |
| 3603055 | 8/1987 | Germany . |
| 2-49862 | 2/1990 | Japan . |

Primary Examiner—Carl D. Friedman
Assistant Examiner—Winnie Yip
Attorney, Agent, or Firm—Richard C. Litman

[57] ABSTRACT

The present invention is a short-term rest facility for travelers that can be erected within existing transportation terminal structures such as airports, bus terminals, train stations, and the like. The traveler's quarters of the present invention has provision for automatically charging the fees for the use of the facility to the guest's credit or debit card account. The traveler's quarters of the present invention contains complete bedroom and bathroom facilities, and other amenities.

9 Claims, 4 Drawing Sheets

TRAVELER'S QUARTERS

BACKGROUND OF THE INVENTION

1. Field of the Invention

The present invention relates to quarters for travelers, provided at transportation terminals, for short term use.

2. Description of the Prior Art

It is common place for travelers to be forced to spend long hours in transportation terminals such as airports, bus terminals, train stations, and the like. For example, the traveler may have become stranded at the transportation terminal due to delays in the arrival or departure of planes, trains, or buses caused by bad weather, or the traveler may have to wait long periods for a connecting bus, train, or flight. The long waits in transportation terminals however are generally not long enough to justify the expense and inconvenience, in terms of time spent traveling to and from the hotel or motel, of obtaining a hotel or motel room. For this reason many forms of short-term accommodations for travelers that fit into preexisting transportation terminal structures have been proposed in the prior art.

U.S. Pat. No. 3,512,314 issued to George et al, shows a rest facility comprising a portable booth enclosed by curtains and having a bed or lounge chair provided therein. The George et al. patent does not teach or suggest the fully enclosed structure of the present invention, or the credit card entry system of the present invention.

U.S. Pat. No. 3,923,134 issued to Rezazadeh, shows rest compartments that are coin operated to allow access to the interior of the compartment. The Rezazadeh patent does not teach or suggest: the credit card entry system of the present invention.

U.S. Pat. No. 4,237,799 issued to Berman, shows an ATM card entry system for a booth housing an ATM. The entry system of the Berman patent does not have provision for charging the patron's card. Further, the Berman patent does not teach or suggest the structure of the traveler's quarters of the present invention.

U.S. Pat. No. 5,111,626 issued to Fortune, discloses a traveler's quarters providing sleep and shower facilities. Housekeeping personnel service and clean the traveler's quarters of the fortune patent. The entry system of the Fortune patent however is different in that it requires the guest to contact an operator by phone to receive a three digit access code in order to gain entry into the facility. Therefore the traveler's quarters of the fortune patent suffers the drawback that it requires a relatively large number of personnel for its operation. Further the traveler's quarters of the Fortune patent does not use the floor and ceiling of the transportation terminal building to fully enclose the traveler's quarters.

U.S. Pat. No. 5,239,792 issued to Avni, shows a sound proof room used to prevent eavesdropping. The Avni patent does not teach or suggest the credit card entry system of the present invention. Further the Avni patent does not teach or suggest the use of the floor and ceiling of a preexisting structure to fully enclose a room.

European Patent document 0 459 852 by Douillard, discloses a traveler's quarters providing sleep and shower facilities. The Douillard patent document does not teach or suggest the credit card entry system of the present invention.

French Patent document 1,406,672 by Lemarignier, discloses a modular habitat structure. The Lemarignier patent document does not teach or suggest the credit card entry system of the present: invention.

German Patent document 36 03 055 by Kutzner, discloses a stacked sleeping cabin arrangement. The Kutzner patent document does not teach or suggest the credit card entry system of the present invention.

Japanese Patent document 2-49862 by Fukui, shows a rest facility which lacks washroom facilities. Further, the Fukui patent document does not teach or suggest the credit card entry system of the present invention.

None of the above inventions and patents, taken either singly or in combination, is seen to describe the instant invention as claimed.

SUMMARY OF THE INVENTION

The present invention is a short-term rest facility for travelers that can be erected within existing transportation terminal structures. The traveler's quarters of the present invention has provision for automatically charging the fees for the use of the facility to the guest's credit or debit card account.

Accordingly, it is a principal object of the invention to provide convenient accommodations for travelers who have to spend relatively long periods of time at transportation terminals.

It is another object of the invention to provide a secure and private space for sleep, work, and personal hygiene activities.

It is a further object of the invention to allow the user of the facility to use a credit or debit card to gain entry to the facility and pay for the use of the facility.

Still another object of the invention is to reduce the labor cost of operating short-term traveler's accommodations provided in transportation terminals.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
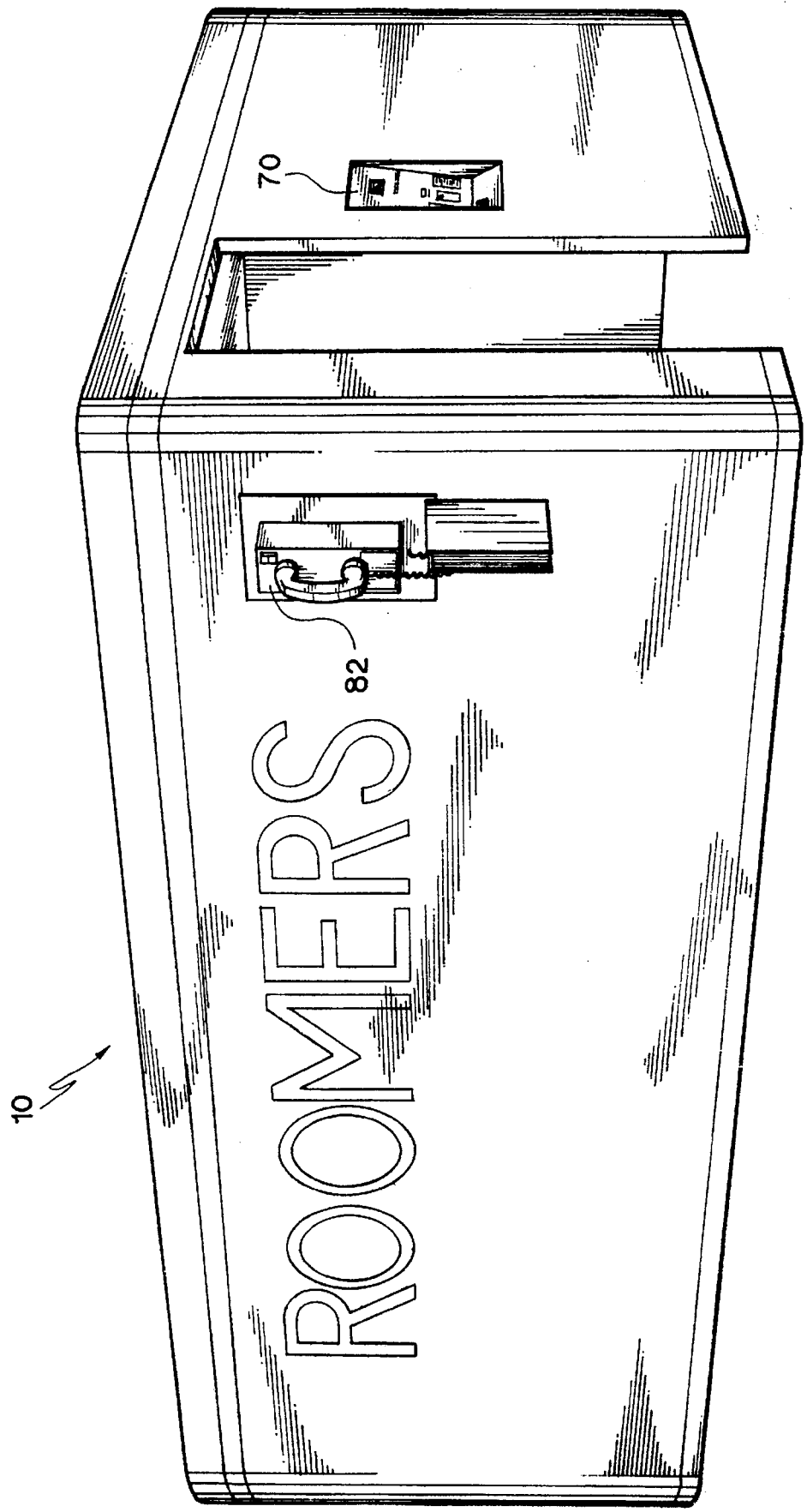
FIG. 1 is a perspective view of the exterior of the traveler's quarters of the present invention.
Figure 2:
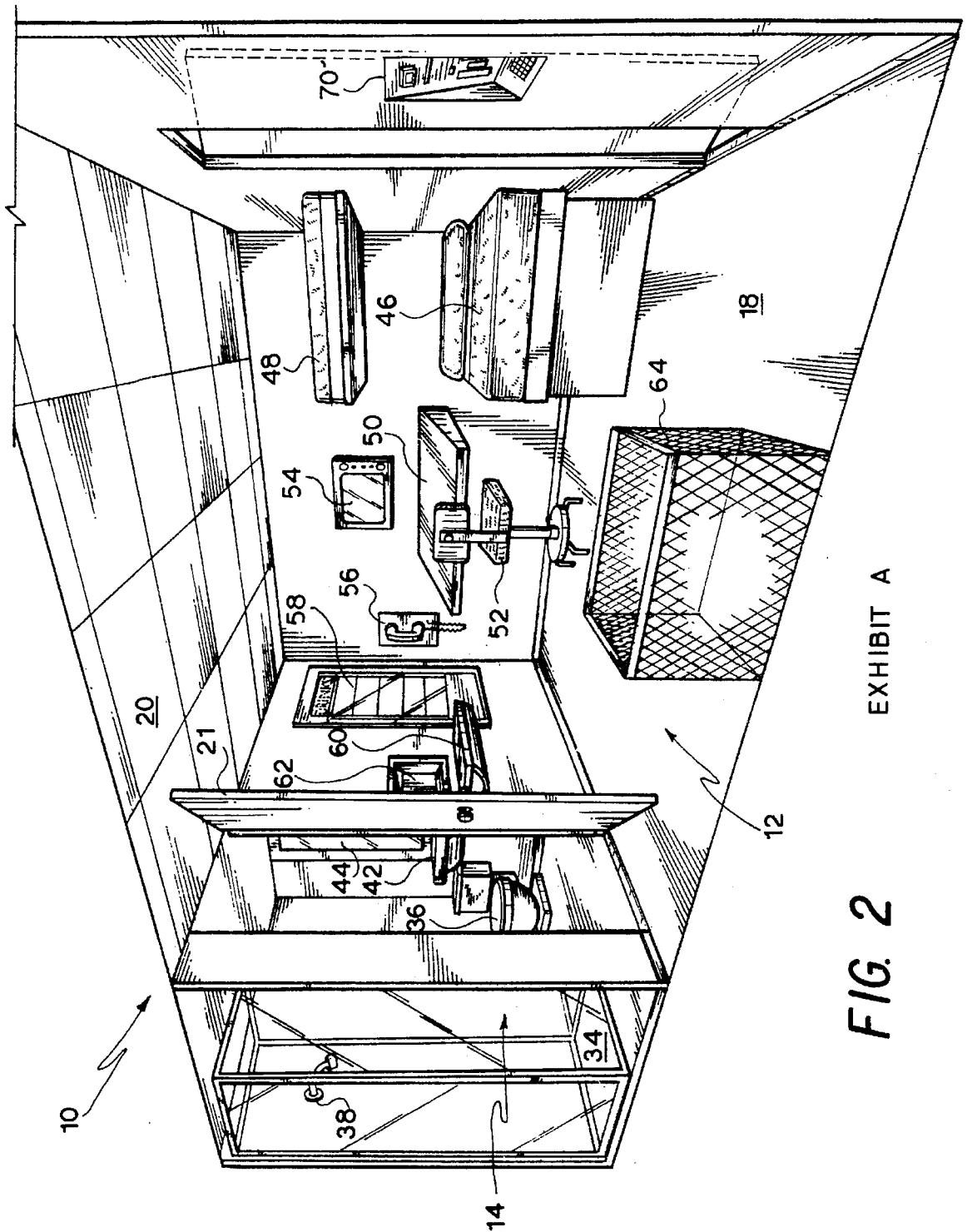
FIG. 2 is a perspective view with a wall broken away to show the interior the traveler's quarters of the present invention.
Figure 3:
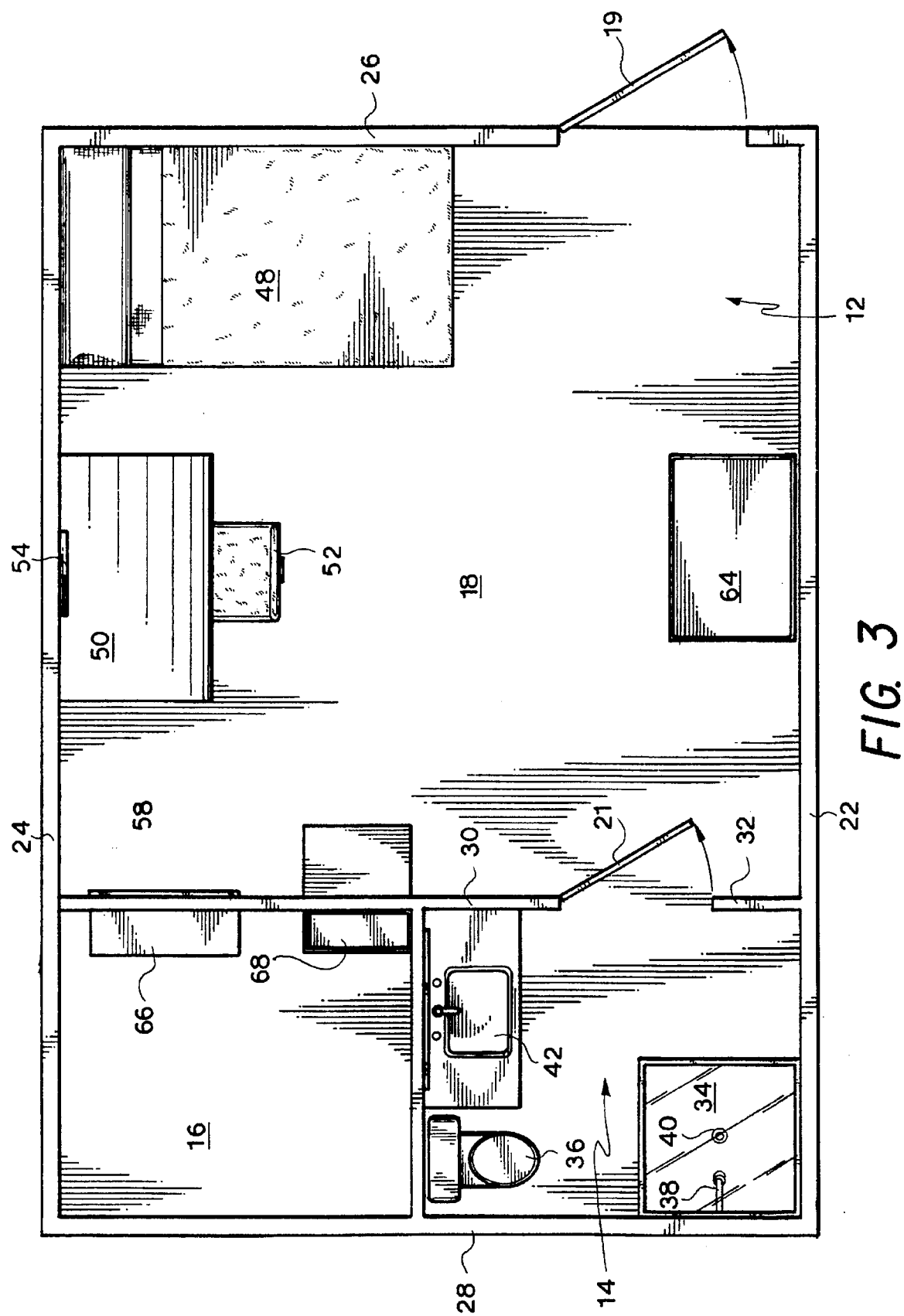
FIG. 3 is a plan view of the interior of the traveler's quarters of the present invention.

Referring to FIGS. 1–3, the present invention is a traveler's quarters 10 that can be erected within preexisting transportation terminal structures. The traveler's quarters 10 is divided into three main areas. These areas are the bedroom 12, the bathroom 14, and equipment room 16. The floor 18 and ceiling 20 of the preexisting transportation terminal structure serve as the floor and ceiling respectively, of the traveler's quarters 10. Door 19 allows entry into the traveler's quarters 10.

The walls 22, 24, 26, 28, 30, and 32 can be constructed of any conventional material. Examples of materials that can be used in the construction of the walls are fiber glass reinforced plastic, metal sheets sandwiching an insulating material, and ISOCHANVRE (processed hemp hurd). The floor of the bathroom 14 and the floor of the shower stall 34 may or may not have to be raised depending on the arrangement of the drains for the shower 34 and the toilet 36. The traveler's quarters 10 is preferably of modular construction, and can be quickly and easily installed at the desired site.

The bathroom 14 is entered through door 21. The bathroom 14 houses a shower stall 34. The shower stall 34 is formed by a transparent enclosure within which a shower head 38 and a drain disposed in the floor of the stall, are provided. The bathroom 14 also houses a toilet 36, a sink 42, and a mirror 44.

The bedroom 12 contains one fixed twin sized sleeping berth 46 and one recessed convertible twin sized berth 48. A drop-leaf desk 50 and a chair 52 are also provided for guests who may need to read, write, or perform office type work while waiting at the transportation terminal. Optionally a computer, a modem, a printer, and/or a facsimile machine (not shown) may also be provided to allow business travelers to conduct business while waiting at the transportation terminal.

An interactive television monitor 54 is also provided in bedroom 12. The monitor 54 can be used to view cable T.V. programming, movies selected by the guest, and arrival and departure information. Telephone 56 can be used to both make outside calls and to summon housekeeping personnel for needed service. The vending machine 58 dispenses drinks, food, candy, and other snacks. Optionally a microwave oven and an ice dispenser may also be provided within the traveler's quarters 10. Ordinarily, condiments, disposable knives, disposable spoons, disposable forks, disposable cups and bowls, napkins, and other such conveniences are also provided within the traveler's quarters 10.

Other desirable amenities (not shown) include a waste basket and an alarm clock. The alarm clock is needed so that the guest may ensure that he or she will wake up in time for his or her flight, train, bus, etc.

For guests with infants and toddlers a changing table 60 is provided to allow the guest to change the infant's or toddler's diaper. Preferably the changing table 60 folds into a recess in wall 30. A trash chute 62 is provided to receive the soiled diapers. A collapsible playpen/crib 64 is also provided for the convenience of guests with small children. The collapsible playpen/crib 64, when in the collapsed configuration, preferably fits into a recess in wall 22 (not shown).

Equipment room 16 houses the storage facility 66 associated with the vending machine 58, and a trash receptacle 68 which is in communication with the trash chute 62. The vending machine storage 66 can preferably be accessed, for restocking, from inside the bedroom 12 by opening the front panel of the vending machine 58. The trash receptacle 68 is dimensioned so as to allow the trash receptacle 68 to be retrieved through the trash chute 62. Alternatively a door may be provided in wall 30 to allow access to the interior of equipment room 16. Equipment room 16 also houses the refrigeration and other equipment associated with the vending machine 58.

If the distance between the floor 18 and ceiling 20 of the preexisting transportation terminal structure permits, the space between the transportation terminal ceiling 20 and a separate ceiling provided for the traveler's quarters 10, can be used to provide storage for equipment such as electrical and telecommunications control and distribution devices.

Figure 4:
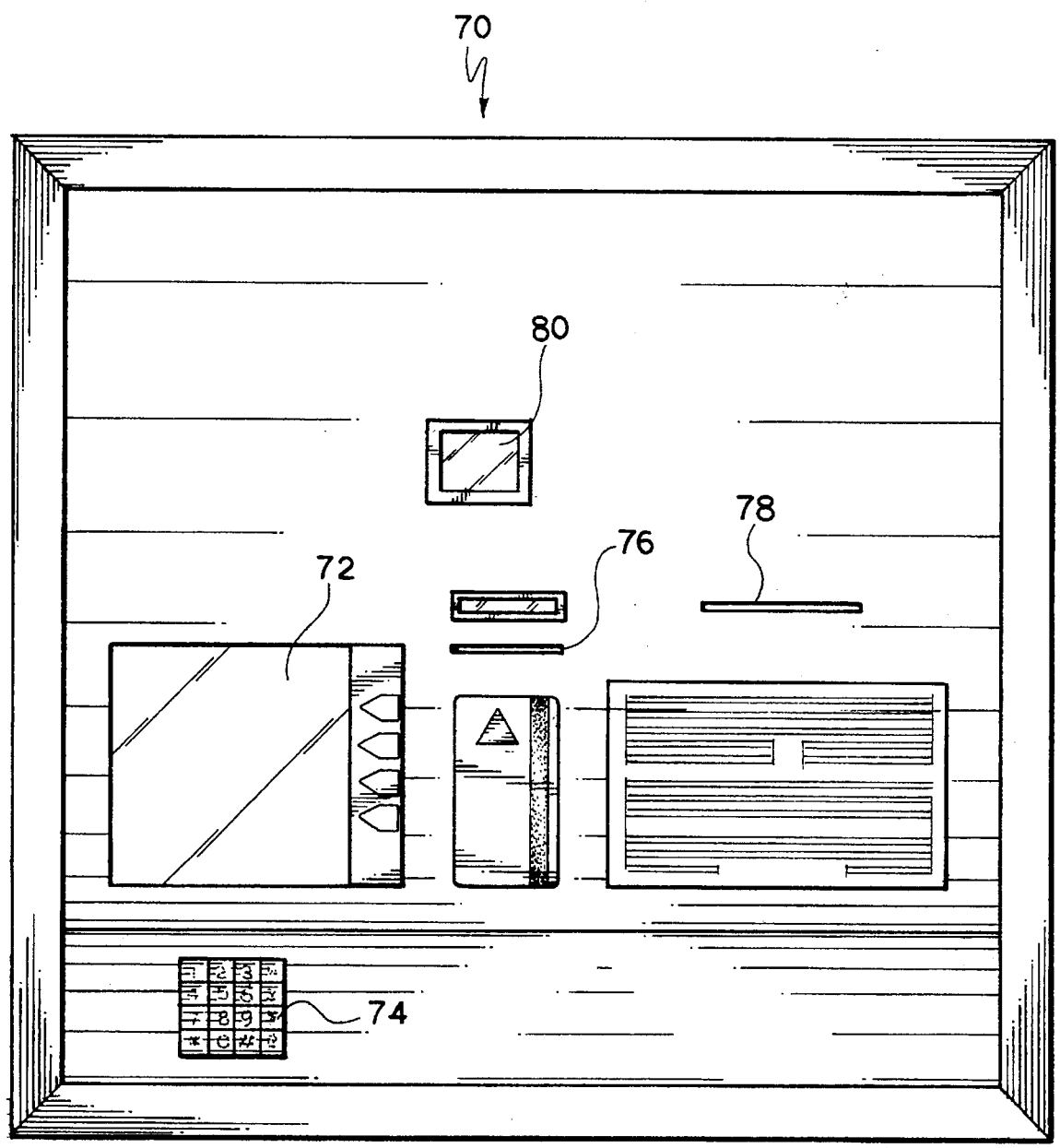
FIG. 4 is a partial view of the exterior of the traveler's quarters of the present invention, showing details of the credit card entry system.

On the outside of the traveler's quarters 10, adjacent the door 19, a credit card entry system 70 is provided. Referring to FIG. 4, the credit card entry system 70 includes a cathode ray tube (CRT) display 72, keyboard 74, credit card slot 76 communicating with a card reader, transaction receipt slot 78 through which a transaction record outputted by a printer can be provided to the guest, and security camera window 80. The entry system 70 can accept both credit cards and debit cards, also referred to as cash cards or bank cards.

To use the traveler's quarters 10, a guest first inserts his or her credit card, cash card, etc. into the slot 76. The guest is then prompted for his or her personal identification number (PIN) by the CRT display 72. The guest can enter his or her PIN using the keyboard 74. If the PIN is correct the guest will then be prompted to enter the duration of his or her stay. To use the traveler's quarters the guest may be charged for at least a minimum duration of time such as one hour. Once the duration of the stay is entered the door 19 is automatically unlocked. As an example a well known solenoid operated latch may be employed to automatically unlock the door 19. A buzzer sounds simultaneously with the unlocking of the latch to notify the guest that he can now enter the traveler's quarters 10.

Once the duration of the stay is entered, housekeeping personnel may be informed of the expected time at which the traveler's quarters will be vacant.

If during the duration of stay entered into the entry system 70, the guest wishes to leave the traveler's quarters 10 temporarily, the guest may reenter the traveler's quarters 10 by using his credit or cash card as a key. Preferably the credit or cash card is inserted in the slot 76 for reentry. In this case, however, the guest is not prompted for any additional information before the door is unlocked. Alternatively a separate card reader, which is operable to unlock the door 19 during the duration of stay entered into the entry system 70, can be provided adjacent the door lock.

If a guest wishes to end his or her stay prior to the end of the duration of stay entered into the entry system 70, the guest will insert his or her card into slot 76 and push a button on keyboard 74 to cause a menu to be displayed on CRT display 72. One of the options provided in the menu is the termination of the stay. When this option is chosen the door 19 is locked, the charges incurred by the guest are charged to his or her account, the guest's card is returned, and a transaction record is provided to the guest through slot 78.

Once the end of the duration of stay is reached an alarm will sound to notify the guest that his or her intended duration of stay is over. Alternatively, housekeeping personnel may be informed of the end of the duration of the stay. The housekeeping personnel may then contact the guest using the phone 56 to inform him or her that the intended duration of stay is over. As another alternative, a computer generated voice may inform the guest that the intended duration of stay is nearly over. This warning is issued, for example, at thirty minutes before the end of the duration of stay.

At this stage the guest may do nothing, in which case the period of time the guest remains in the traveler's quarters, over and above the duration of stay originally specified by the guest, is added to the duration of stay originally specified the next time the guest leaves the traveler's quarters 10. The stay is then automatically terminated and a transaction record printed for the guest. Also when the guest leaves as planned, the stay is automatically terminated and a transaction record printed for the guest. In both cases a delay is provided before termination of the stay to allow the guest to activate a menu and select the option to extend the stay using keyboard 74. The guest may extend the duration of stay at any time using the keyboard 74 or a similar device 70 ' duplicated in the interior of the traveler's quarters 10 as shown in FIG. 2.

As an option, before the stay is terminated a computer generated voice may remind the guest to make sure that they have all of their personal items. This computer generated voice reminder is preferably activated when the door to the traveler's quarters 10 is opened.

Once a stay has terminated, housekeeping personnel are automatically notified so that they can service and clean the traveler's quarters 10 before occupancy by the next guest. The traveler's quarters 10 will remain inaccessible until housekeeping personnel complete their cleaning and reset the computer for new occupancy. Disposable towels and sheets are preferably used in the traveler's quarters 10 to simplify cleaning thereof.

The components used in the entry system 70 are well known and are commonly used in automatic teller machines, also known as ATMs. A microprocessor, microcomputer, or like device coordinates directs all the various functions of the entry system 70. Also other display devices such as LED displays, LCD displays, or flat panel displays may be used in place of the CRT display described above.

A pay phone 82 is preferably provided on the exterior of the traveler's quarters 10, so that a guest may conveniently summon housekeeping personnel in the event of difficulties with the entry system 70.

The traveler's quarters 10 is preferably provided with soundproof walls. Also environmental controls are provided within the traveler's quarters 10 to allow the guest to set the environmental conditions within the traveler's quarters 10 at the levels most comfortable for him or her.

It is to be understood that the present invention is not limited to the sole embodiment described above, but encompasses any and all embodiments within the scope of the following claims.

I claim:

1. A modular traveler's quarters for installation within a preexisting transportation terminal structure, said traveler's quarters comprising:

four external walls forming an enclosed perimeter, said enclosed perimeter being partitioned into at least a bathroom portion and a bedroom portion;

an entry door allowing entrance into said bedroom portion from outside said enclosed perimeter when said entry door is unlocked; and a credit card entry system provided adjacent said entry door, said entry system capable of unlocking said entry door in response to at least an account number of a credit card and a personal identification number supplied by a user, wherein said entry system comprises a microprocessor in communication with a banking institution affiliated with the user, a card reader for receiving and recognizing an account number of the users credit card a display device capable of prompting the user for inputting a personal identification number and a duration of time during which the user intends to occupy said modular traveler's quarters, and a keyboard for inputting the personal identification number and the duration of time, whereby the user can electronically prepay for occupancy of said modular traveler's quarters without any personnel assistance.

2. The modular traveler's quarters according to claim 1, where said bedroom portion includes a berth and a desk.

3. The modular traveler's quarters according to claim 2, where said bedroom portion further includes a vending machine for food and drinks.

4. The modular traveler's quarters according to claim 1, where said bathroom portion includes a shower, a toilet, and a sink.

5. The modular traveler's quarters according to claim 1, wherein said four walls are dimensioned and configured to form an enclosed space in cooperation with a floor and a ceiling within the preexisting transportation terminal structure.

6. A modular traveler's quarters for installation within a preexisting transportation terminal structure, said modular traveler's quarters comprising:

four external soundproof walls forming an enclosed perimeter wherein said four walls are dimensioned and configured to form an enclosed space in cooperation with a floor and a ceiling within the preexisting transportation terminal structure, said enclosed perimeter being partitioned into at least a bathroom portion and a bedroom portion;

an entry door allowing entrance into said bedroom portion from outside said enclosed perimeter when said entry door is unlocked;

a credit card entry system provided adjacent said entry door, said entry system capable of unlocking said entry door in response to at least an account number of a credit card and a personal identification number supplied by a user, wherein said entry system comprises a microprocessor in communication with a banking institution affiliated with the user, a card reader for receiving and recognizing the account number of the user's credit card, a first display device capable of prompting the user for inputting the personal identification number and a duration of time during which the user intends to occupy said modular traveler's quarters, and a keyboard for inputting the personal identification number and the duration of time; and a second display device provided inside said bedroom portion, said second display device being in communication with said entry system for displaying a menu to increase or terminate the duration of time, whereby the user can electronically pay for occupancy of said modular traveler's quarters without any personnel assistance.

7. The modular traveler's quarters according to claim 6, where said bedroom portion includes a vending machine for food and drinks.

8. The modular traveler's quarters according to claim 6, where said bedroom portion further includes a berth and a desk.

9. The modular traveler's quarters according to claim 6, where said bathroom portion includes a shower, a toilet, and a sink.

* * * * *